(12) United States Patent
Oomen et al.

(10) Patent No.: US 7,149,159 B2
(45) Date of Patent: Dec. 12, 2006

(54) METHOD AND APPARATUS FOR EDITING DATA STREAMS

(75) Inventors: Arnoldus Werner Johannes Oomen, Eindhoven (NL); Leon Maria Van De Kerkhof, Eindhoven (NL); Francesco Felix Maria Zijderveld, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 1084 days.

(21) Appl. No.: 10/124,061

(22) Filed: Apr. 17, 2002

(65) Prior Publication Data

US 2003/0004708 A1 Jan. 2, 2003

(30) Foreign Application Priority Data

Apr. 20, 2001 (EP) ................................. 01201440

(51) Int. Cl.
*G11B 15/52* (2006.01)

(52) U.S. Cl. ................................ 369/47.13; 369/30.05; 369/275.3

(58) Field of Classification Search ..................... None
See application file for complete search history.

(56) References Cited

U.S. PATENT DOCUMENTS 6,661,762 B1 * 12/2003 Verbakel et al. .......... 369/59.25
6,721,710 B1 *  4/2004 Lueck et al. ................ 704/500

* cited by examiner

*Primary Examiner*—Paul W. Huber

(57) ABSTRACT

MP3 decoders decode MP3 data streams that comprise headers and signal data interspersed with each other, each header specifying a distance to a subsequent header, each header corresponding to a frame of signal data, the header being associated with a pointer that points to a starting point of the signal data for that frame relative to the header. An editing system cuts tracks from existing data streams. During editing, a user signals a header corresponding to the start of the desired track. The track is from the data stream, including a part of the data stream pointed at by the header and preceding the specified header. A new MP3 compatible data stream is written to a medium. The new data stream contains said header as first valid header and said part of the data stream preceding the header.

12 Claims, 3 Drawing Sheets

METHOD AND APPARATUS FOR EDITING DATA STREAMS

Figure 1:
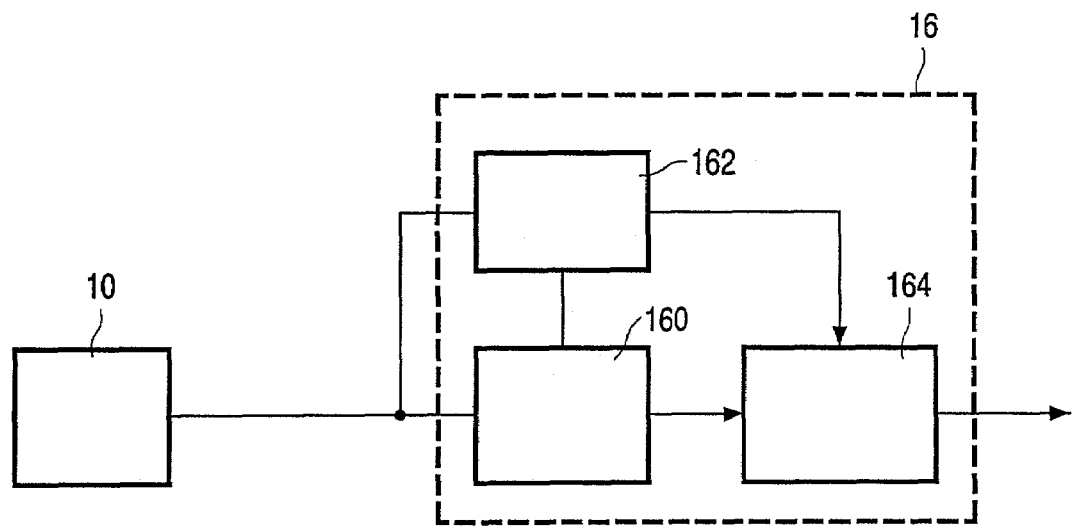

The invention relates to editing of encoded data streams and seamless playing of those data streams, in particular audio data streams, such as MPEG layer III (MP3) data streams.

The MPEG-1 and MPEG-2 Layer III format (briefly called MP3, officially named ISO/IEC 11172-3 and ISO/IEC 13818-3 respectively) are used extensively for representing compressed audio information.

The MP3 audio information is transported in a data stream that contains headers at specific intervals. Each header is associated with a frame describing a predetermined number of samples of audio data in compressed form. The header indicates information about the data in the frame, such as the sampling frequency of the data in the frame and the bit rate.

The interval between successive headers is a predetermined function of information in the header. However, the actual number of bits needed to represent a frame can deviate from the space available in the interval between the headers. This is possible because MP3 players contain a so-called short term buffer, from which frames that need more bits to realize a certain audio quality level can read bits that are not used in frames that need less bits to realize that quality level.

To cope with these deviations MP3 allows frames to start at a variable offset relative to the headers. Thus, space left over between headers by preceding frames can be used for data of subsequent frames. MP3 provides for a pointer associated with each header. The pointer indicates the start of data of the frame associated with the header relative to the position of the header. As a result the stream a frame of data can start at a variable position preceding the associated header, in space left over by the preceding frame. Thus, the position of the start of the data relative to the position of the header depends on the audio content encoded by the data stream.

It has been found that the pointers impede implementation of editing in MP3 and seamless playback of edited tracks. If the audio stream has to be split into tracks, for example to facilitate user access to different parts of a long piece of music, the initial part of each track will generally be invalid because it contains one or more headers that refer back to a preceding track. In practice this will result in interrupted playback at track boundaries. Thus, it becomes impossible to provide for seamless play back of different tracks one after the other.

As a result, relatively complicated decoders are needed to support editing and/or seamless playback. In the extreme, it may be necessary to decompress the data before performing these functions, which is very inefficient in terms of complexity and quality.

SUMMARY OF THE INVENTION

Amongst others, it is an object of the invention to provide for seamless playback in the case of concatenation of data streams like MP3 streams.

The invention provides for a method of editing a data stream of a type that comprises headers and signal data interspersed with each other, each header specifying a distance to a subsequent header, each header corresponding to a frame of signal data, the header being associated with a pointer that points to a starting point of the signal data for that frame relative to the header, the method comprising:

receiving a command specifying a header in an incoming data stream, the specified header corresponding to a position in the signal that has to serve as a start of a track;
extracting the track from the data stream, including a part of the data stream pointed at by the specified header and preceding the specified header;
writing a new data stream of said type to a medium, the new data stream containing said header as first valid header and said part of the data stream preceding the specified header in the incoming data stream.

By creating a new MP3 type stream that including a leading part in the stream from a point preceding the first valid header, decoders like MP3 decoders, are enabled to decode the signal data associated with that first valid header. In one embodiment, the leading data is moved after the initial header (whose pointer is set to zero) and the header is modified to create more space between it and the next header to accommodate the data that has been moved. In an MP3 stream, preferably the bit rate in the first header is modified to create this space.

In another embodiment the newly created stream contains data in front of the first valid header, so that the first valid header may point back, if the pointer associated with that header points back to a location in front of the header. Preferably any headers in the leading part are invalidated, for example by making their associated pointer point back in front of the leading part, or by including invalidating information in the header.

Preferably, the leading part has a predetermined length equal to a maximum possible distance over which the pointer of the first valid header points back.

The invention also provides for media that contain streams that allow seamless playback.

These and other objects and advantageous aspects of the method, apparatus and medium according to the invention will be described in more detail using the following figures.

Figure 3:
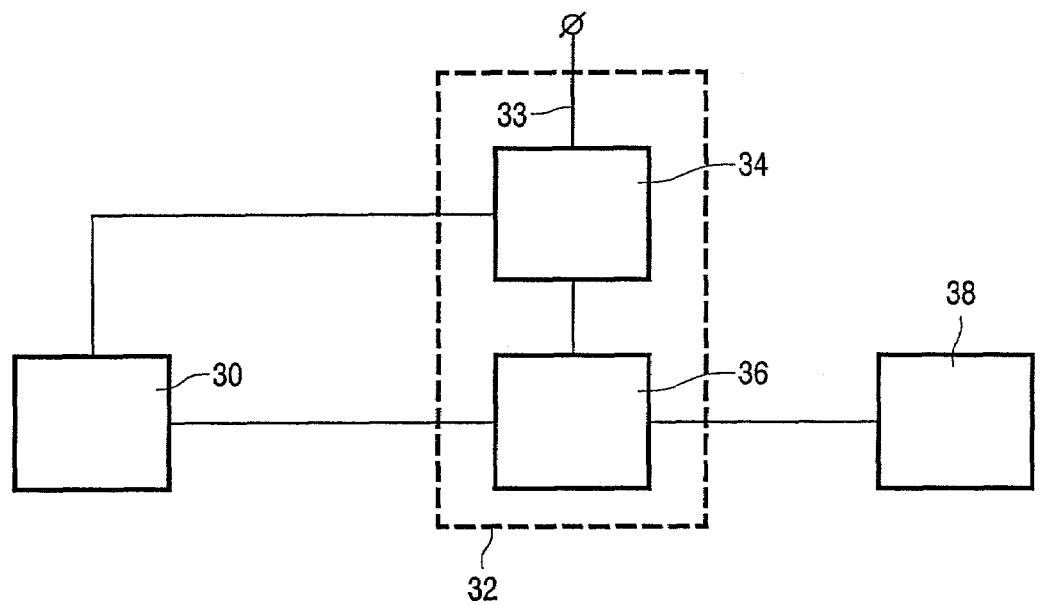
Figure 2:
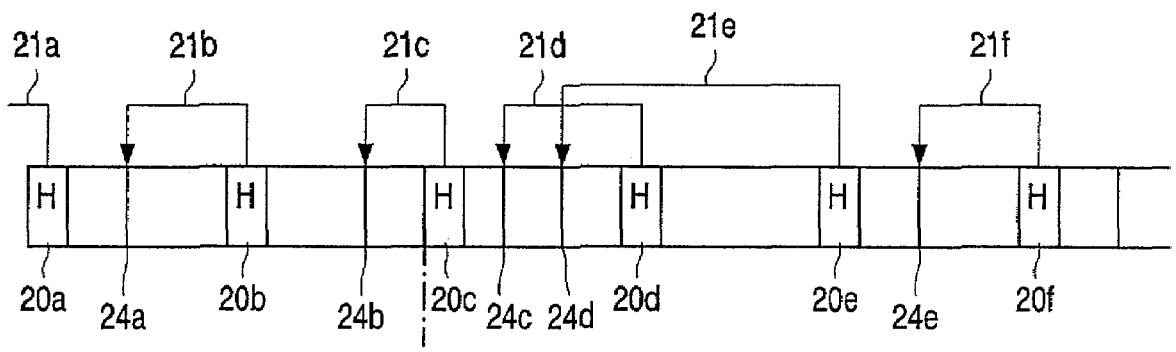
Figure 4:
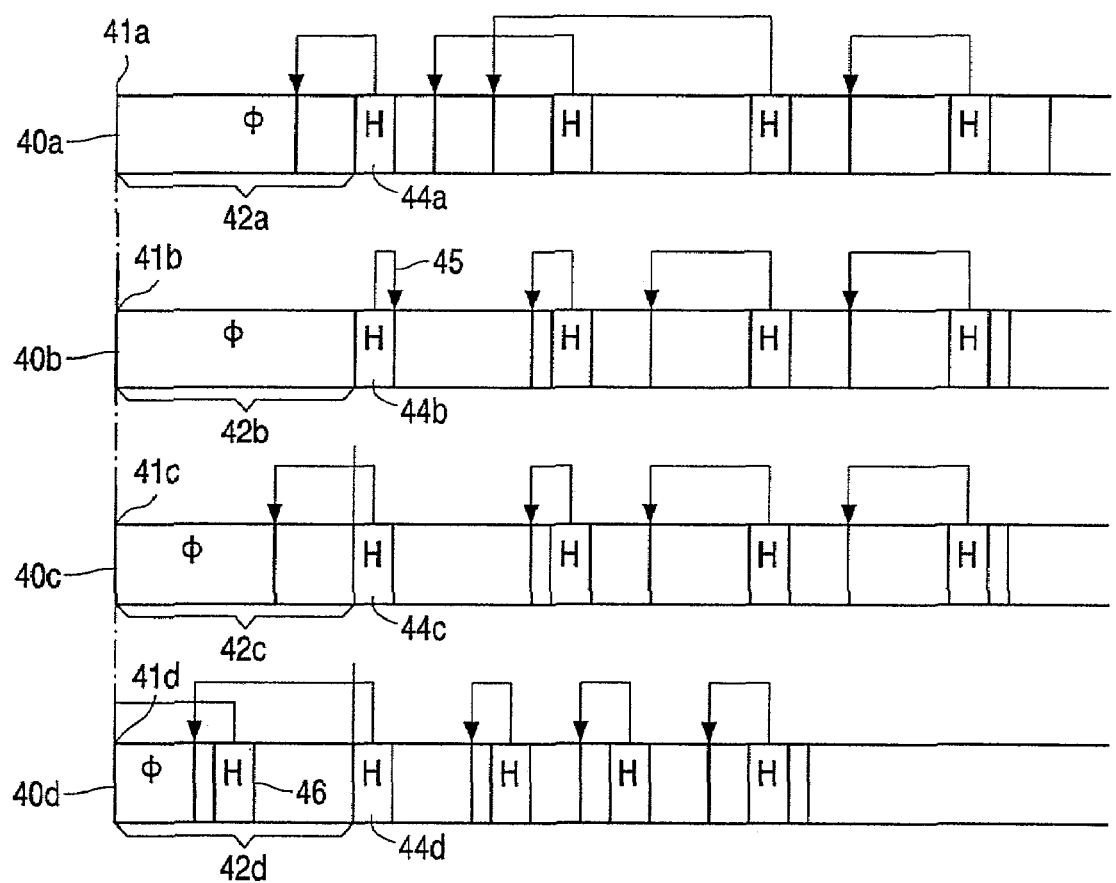
Figure 5:
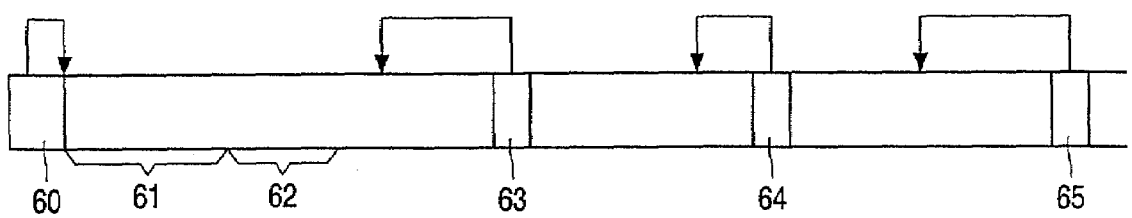
Figure 6:
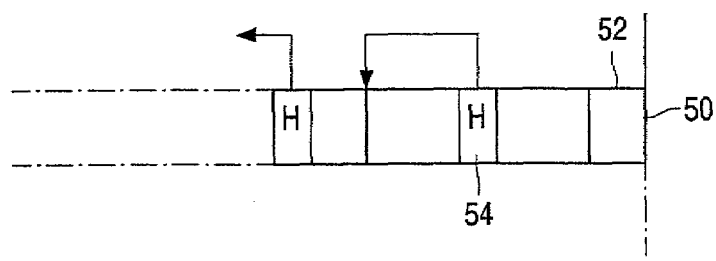

FIG. 1 shows an MP3 decoding system;
FIG. 2 shows an example of a stream of MP3 data;
FIG. 3 shows an editing system;
FIG. 4 shows examples of tracks;
FIG. 5 shows a further example of a track;
FIG. 6 shows a trailing part of a track.

The invention will be described using MPEG-1 layer III as an example. However, the same principles apply to MPEG-2 layer III, where some constants have different values.

FIG. 1 shows a prior art MP3 decoding system. The system contains an MP3 source 10 that feeds a stream decoder 16. The MP3 source 10 contains for example a storage medium (not shown) for stored MP3 data and a read-out unit (not shown) for reading that data from the storage unit, in another example, the MP3 source 10 contains an interface to a communication channel (e.g. the Internet or a radio broadcast) and an output for outputting a received MP3 stream.

The stream decoder 16 contains a buffer memory 160 with an input coupled to the MP3 source 10, a header detector 162 and a frame decoder 164. The header detector has an input coupled to the buffer memory 160. The frame decoder 164 has inputs coupled to the header detector 162 and the buffer memory 160 and an output for decoded audio.

FIG. 2 shows an example of a stream of MP3 data. The stream contains a number of headers 20a–f, with backpointers 21a–f that point to the starting points 24a–e of frames. The backpointers 21a–f are illustrated by means of arrows pointing back from the headers associated with the backpointers 21a–f to the starting points 24a–e to which the backpointers 21a–f point.

Each header 20a–f corresponds to a frame of compressed audio data. A backpointer 21a–f following the header 20a–d indicates the starting point 24a–e of data in the frame (headers and side information are not counted in the pointers). The backpointer 21a–f may be zero, in which case the starting point 24a–e follows directly after the header 20a–f.

The format of an MP3 header part preceding the back pointer is described in table I.

TABLE I format of MP3 header

| Field | Number of bits |
|---|---|
| syncword | 12 |
| ID | 1 |
| layer | 2 |
| protection bit | 1 |
| bitrate index | 4 |
| sampling frequency | 2 |
| padding bit | 1 |
| private bit | 1 |
| mode | 2 |
| mode extension | 2 |
| copyright | 1 |
| original/copy | 1 |
| emphasis | 2 |

The "syncword" is a specific bit pattern that facilitates the identification of headers 20a–d in the stream. The ID, layer, private bit, mode, mode expansion, copyright, original/copy and emphasis fields are specific to MP3 and do not concern the invention. The protection bit signals whether the header is followed by a 16 bit CRC word (Cyclic Redundancy Check; determined using a CRC 16 polynomial). After the optional CRC word follows the backpointer 21a–d (also called "main_data_begin"), which is a nine bit number, which indicates how many (8-bit) bytes the starting byte of the frame 24a–c is back from the position of the backpointer 21a–d (not counting header bytes, CRC words and side-information).

The bitrate index field of the header contains a pointer to an entry in a table of possible bitrates. Available bit rates and corresponding bit rate indices are shown in table Ia TABLE Ia bit rate index values and corresponding bit rates

| bit_rate_index | bitrate (kbit/s) |
|---|---|
| '0000' | free |
| '0001' | 32 |
| '0010' | 40 |
| '0011' | 48 |
| '0100' | 56 |
| '0101' | 64 |
| '0110' | 80 |
| '0111' | 96 |
| '1000' | 112 |
| '1001' | 128 |
| '1010' | 160 |
| '1011' | 192 |
| '1100' | 224 |
| '1101' | 256 |
| '1110' | 320 |
| '1111' | forbidden |

The sampling frequency field indicates the sampling frequency used for the data. Available sampling frequencies are shown in table Ib TABLE Ib Sampling frequency code and corresponding sampling frequencies

| sampling_frequency | frequency specified (kHz) |
|---|---|
| '00' | 44.1 |
| '01' | 48 |
| '10' | 32 |
| '11' | reserved |

Together the bit rate and the sampling frequency determine the distance from the start of the header to the start of a subsequent header. The distance in bytes (units of 8 bits) is determined from the value of R, where $$R = 144 * \text{bit\_rate}/\text{sampling\_frequency}.$$

(the number 144 is specific for MPEG layer III).

In operation, MP3 source 10 produces an MP3 stream as illustrated in FIG. 2. Information from this stream is stored in buffer memory 160 of stream decoder 16. Header detector 162 initially locates a header at the start of the stream by detecting the syncword of a header. Subsequently, header detector 162 uses information contained in the current header to compute the distance to a subsequent header in the stream from the bitrate index field, the sampling frequency field of the header and the padding bit. From this distance header detector 162 computes the address of the location in buffer memory 160 where the next header is stored and reads the next header and so on. The header detector 162 checks whether the correct syncword is stored at the computed location. If not, an error has occurred and the header detector has to process an error condition and has to locate the next valid header before decoding can proceed.

Header detector 162 sends the address of the location where the header is stored to frame decoder 164. Frame decoder 164 uses this address to determine the address where the backpointer associated with the header is stored, retrieves the backpointer and uses the backpointer to compute the address where the starting point of the frame associated with the header is stored. Frame decoder 164 uses this address to retrieve data from the frame, from which it decodes the audio signal.

FIG. 3 shows an editing system. The editing system comprises a first medium 30, an editing apparatus 32 and a second medium 38. The editing apparatus 32 comprises a control unit 34 and a stream processor 36. The stream processor 36 is coupled between the first medium 30 and the second medium 38. The control unit 34 has a control input 33 and is coupled to the stream processor 36 and the first medium 30.

In operation the editing system creates newly structured data streams (tracks) in the second medium 38. The newly structured data streams (tracks) are constructed so that they are decodable by MP3 decoders with a minimum effort to construct the new stream. In general, the system (under control of control unit 32) will create a file structure on second medium 38 (for example a File Access Table (FAT)) that provides access to individual tracks on the second medium, for example by means of a table of pointers that point to the starting positions of tracks in the second medium 38.

The editing system reads a data stream from the first medium 30 (which may be an (magneto-)optical storage disk, a magnetic tape, an Internet outlet etc.). The editing system extracts a portion of the data stream and writes it as a newly defined track to second medium 38. The newly create track is constructed so that it is decodable with a conventional MP3 decoder. Second medium 38 may be one and the same as the first medium, or a separate medium of any type. The data in the newly defined track is extracted from a larger stream in first medium 30 where it is not the entire content of an individual track.

At its input 33, control unit 32 receives a selection signal, which indicates the position of the first header of the newly defined track in the data stream from first medium. From this selection, control unit 32 selects a starting point of a part of the data stream that precedes the first header by a predetermined number of bits. Control unit 32 instructs stream processor 36 to read the stream from first medium 30 beginning from the starting point or from a position in front of the starting point. Moreover, control unit 32 instructs stream processor 36 to write a predetermined number of bits of data to second medium 38 starting from the starting point. This data corresponds to a predetermined part of the data stream from first medium 30 preceding the first header. At least from the position to which the backpointer of that first header points, this data is copied from the data stream from the first medium 30 (before that position default data may be included, or data may be copied from the data stream). Also, control unit 32 instructs stream processor 36 to remove any headers from the stream written to second medium 38 before the first header. Alternatively, the headers may be invalidated, for example by ensuring that the backpointers in those headers to the signal data point to a part of the data stream that is not sent to the second medium 38, although this incurs certain risks if the headers are interpreted wrongly by a decoder. Thus, a track is created in second medium 38 that contains signal data in front of the first valid header, so that, when applied to a stream decoder 16, decoding of this track will start from the data associated with the first valid header. It is not necessary to move the data relative to the header, nor is it necessary to adjust the space between headers to create the new track.

The predetermined number of bits is chosen so that it spans the maximum distance over which the backpointer in the first valid header may point back. In the case of MP3 for example, a predetermined distance of at least 691 bytes is chosen, because the backpointers in MP3 can point back at most over 691 bytes, but a larger predetermined distance may be used.

In general, the data stream will not contain a header at the starting point. This is no problem, but if desired, the stream processor 36 may be arranged to write an invalid header at the starting point. However, this requires additional complexity in the editing apparatus. Similarly, the stream processor 36 may be arranged to suppress data up to the point where the backpointer of the first valid header points. But this also required additional complexity.

FIG. 4 shows a number of examples of tracks 40*a–d* that are newly generated from a data stream in this way. The starting points 41*a–d* of these tracks are shown vertically aligned. A predetermined distance after the starting point 41*a–d*, the track contains a first valid header 44*a–d*. A first one 40*a* of these tracks corresponds to part of the data stream shown in FIG. 2, in which the first valid header 44*a* is equal to the third header 20*c* from the data stream in FIG. 2. As can be seen, data associated with this header starts in the leading part 42*a* of the track 40*a* included before the first valid header 20*c*. Similarly, the other tracks 40*b–d* all contain leading parts 42*b–d* before their first valid header 44*b–d*. By way of example, one of the tracks 40*b* is shown to have a zero backpointer 45. In this case, no leading part 42*b* is necessary, but to avoid overhead to determine this, a leading part 42*b* is included nevertheless. As another example, another track 40*d* is shown to contain a header 46 in the leading part 42*d*, but this header is invalid because its associated backpointer points back beyond the start of the leading part 42*d* of the track 40*d*. Preferably, however, all headers are removed from the leader part 42*d* (the backpointer of the first header being correspondingly updated if necessary).

All the tracks 40*a–d* shown in FIG. 4 can be decoded by decoder 16. This decoder 16 will load the leading part 40*a–d* into memory, but it will decode data only starting from the first valid header 44*a–d*, because this is the first valid header in the track. Earlier headers, if any, are skipped, because the backpointer to their associated data points back beyond the start of the track.

FIG. 5 shows an alternative edited data stream. The edited data stream contains headers 60, 63, 64, 65, signal data between the headers 60, 63, 64, 65 and backpointers to the signal data. The frame data 61 that preceded the specified header 60 in the original data stream form a position pointed at by the backpointer in the original stream is moved to a position after the header 60 in the edited data stream. Thus, both the part 61 that was originally stored preceding the header and a part 62 that was originally stored after the header are now combined after the header.

The bit rate index in the header 60 is modified with respect to that in the original data stream, so as to make the header 60 indicate a larger distance to the next header 63 than in the original data stream. The bit rate in the modified header 60 is selected so that this distance is sufficient to allow space for the data that was included between the specified header 60 and the next header in the original stream, plus the frame data 61 that has been moved to a position between these headers. The bit rate is given its maximum possible value, or at least a value that results in a distance that is larger than needed. It has been found that in MP3 it is thus always possible to create sufficient distance. In general, the distance will not correspond exactly to the required amount of space, but will be larger than necessary. The resulting extra space is padded with dummy data.

FIG. 6 shows a trailing part of a further track 50 generated by the editing system. This track corresponds to the front part of the data stream of FIG. 2. and ends at the position of the first valid header of the first track 40*a* of FIGS. 4 or 5.

Decoder 16 accesses the tracks using some access information, such as for example a file access table (FAT). Such a FAT contains pointers to the starting points of tracks, such as starting points 41*a–d*.

When an MP3 decoder reads the track of FIG. 6 and the first one 40*a* of the tracks of FIGS. 4 or 5 are fed in succession to decoder 16, decoder 16 will seamlessly decode the data corresponding to the data stream of FIG. 2. In this case the decoder 16 first receives the track 50 of FIG. 6, including a trailing part 52 that it will not use, because the trailing part 52 follows the data for the last valid header 54 in the track and because it is not pointed at by any next valid header in the track 50. Subsequently, decoder 16 receives the leading part 42*a* of the first one of the tracks 40*a*, but it will decode only from the first valid header 44*a* that it encounters in the track 40*a*. Thus, the data corresponding to the last header 54 in the track of FIG. 5 is followed directly by the data corresponding to the first valid header 44*a* of the subsequent tracks. These headers correspond to successive headers 20*c,d* in the original data stream (FIG. 2).

Alternatively, the decoder 16 can decode the other tracks 40b–d of FIG. 4 or 5 following the track of FIG. 6 without transition. It does not matter where the data for the first valid header 44a–d starts.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word 'comprising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of editing a data stream of a type that comprises headers (20a–f) and signal data interspersed with each other, each header (20a–f) specifying a distance to a subsequent header (20a–f), each header corresponding to a frame of signal data, the header being associated with a pointer (21a–e) that points to a starting point (24a–e) of the signal data for that frame relative to the header (20a–f), the method comprising:
  receiving a command specifying a header (20a–f) in an incoming data stream, the specified header corresponding to a position in the signal that has to serve as a start of a track;
  extracting the track from the data stream, including a part (42a–d, 61) of the data stream pointed at by the specified header (20a–f) and preceding the specified header;
  writing a new data stream (40a–d) of said type to a medium, the new data stream (40a–d) containing said header (44a–d, 60) as first valid header and said part (42a–d, 61) of the data stream preceding the specified header (44a–d) in the incoming data stream.

2. A method according to claim 1, the distance being specified in said type of data stream by means of a bitrate indication and a sampling frequency indication, the method comprising
  writing said part (61) of the data stream to the medium following said header (60);
  writing said header (60) to the medium in modified form, the bit rate indication in the header (60) being modified so as to modify the distance between the header (60) and a succeeding header (63) to accommodate said part of the data stream (61) in addition to further data (62) from between the header (60) and the succeeding header (63) from the original stream.

3. A method according to claim 1, wherein a leader (42a–d) containing said part is written to the medium at the beginning of the track (40a–d) preceding the specified header (44a–d), the leader (42a–d) having a predetermined length independent of the header (44a–d), the leader (42a–d) containing a copy of data from the data stream at least from a position pointed at by the pointer associated with the specified header (44a–d).

4. A method according to claim 3, comprising invalidating or removing a preceding header that precedes the specified header in the leader.

5. An apparatus for editing a data stream of a type that comprises headers and signal data interspersed with each other, each header specifying a distance to a subsequent header, each header corresponding to a frame of signal data, the header being associated with a pointer that points to a starting point of the signal data for that frame relative to the header, the apparatus comprising:
  an input for receiving the data stream;
  an input for receiving a command specifying a header in the data stream that has to serve as a start of a track;
  an extraction unit for extracting the track from the data stream, including a part of the data stream preceding the specified header and pointed at by the header;
  a writing unit for writing a new data stream of said type to an output, the new data stream containing said header as first valid header and said part of the data stream.

6. An apparatus according to claim 5, the distance being specified in said type of data stream by means of a bitrate indication and a sampling frequency indication, the writing unit being arranged to
  write said data to the medium following said header;
  write said header in modified form, the bit rate indication in the header being modified so as to modify the distance between the header and a succeeding header to accommodate said data in addition to further data from between the header and the succeeding header in the original stream.

7. An apparatus according to claim 5, arranged to write a predetermined length of said part to the medium, the predetermined length being independent of a content of the data stream.

8. An apparatus according to claim 7, comprising invalidating a preceding header that precedes the specified header in the leading part.

9. A machine readable medium carrying a data stream of a type that comprises headers and signal data interspersed with each other, each header specifying a distance to a subsequent header, each header corresponding to a frame of signal data, the header being associated with a pointer that points to a starting point relative to the header, the starting point indicating where the signal data for that header starts, the medium comprising
  information pointing to a start of said data stream in the medium, the data stream comprising at its start, prior to an initial valid header, an amount of information containing signal data pointed at by the pointer associated with the initial valid header.

10. A medium according to claim 9, the amount of information comprising one or more invalidated headers.

11. A medium according to claim 9, the medium includes a first and second track of an audio signal, the first and second track together representing a continuous part of the audio signal, the data stream corresponding to the second track, the first track corresponding to a further data stream of said type comprising at its end, past all signal data for valid headers in the further data stream a copy of said signal data pointed at by the initial valid header.

12. A medium carrying a data stream of a type that comprises headers and signal data interspersed with each other, each header specifying a distance to a subsequent header, each header corresponding to a frame of signal data, the header being associated with a pointer that points to a starting point relative to the header, the starting point indicating where the signal data for that header starts, the distance being specified in said type of data stream by means of a bitrate indication and a sampling frequency indication, the medium comprising a first header and following headers, the first header having a bit rate indication higher than the following headers.

* * * * *